United States Patent
Wuensche

(10) Patent No.: US 11,144,311 B2
(45) Date of Patent: Oct. 12, 2021

(54) STATIC ANALYSIS OF HIGHER-ORDER MERGE CONFLICTS IN LARGE SOFTWARE DEVELOPMENT PROJECTS

(71) Applicant: SAP SE, Walldorf (DE)

(72) Inventor: Thorsten Bernhard Wuensche, Walldorf (DE)

(73) Assignee: SAP SE, Walldorf (DE)

(*) Notice: Subject to any disclaimer, the term of this patent is extended or adjusted under 35 U.S.C. 154(b) by 0 days.

(21) Appl. No.: 16/668,633

(22) Filed: Oct. 30, 2019

(65) Prior Publication Data
US 2020/0364042 A1    Nov. 19, 2020

Related U.S. Application Data

(60) Provisional application No. 62/849,544, filed on May 17, 2019.

(51) Int. Cl.
*G06F 8/71* (2018.01)
*G06F 16/176* (2019.01)
*G06F 8/77* (2018.01)

(52) U.S. Cl.
CPC ............ *G06F 8/71* (2013.01); *G06F 8/77* (2013.01); *G06F 16/1767* (2019.01)

(58) Field of Classification Search
CPC .......... G06F 8/71; G06F 16/1767; G06F 8/77
See application file for complete search history.

(56) References Cited

U.S. PATENT DOCUMENTS

| | | | | |
|---|---|---|---|---|
| 9,471,304 | B1* | 10/2016 | Fuchs | G06F 8/71 |
| 9,652,485 | B1* | 5/2017 | Bhargava | G06F 16/1774 |
| 2008/0244522 | A1* | 10/2008 | Bernin | G06F 8/71 717/122 |
| 2014/0237447 | A1* | 8/2014 | Santos Luaces | G06F 8/71 717/110 |
| 2015/0220332 | A1* | 8/2015 | Bernstein | G06F 8/71 717/121 |
| 2015/0379061 | A1* | 12/2015 | Paraschivescu | G06F 8/71 707/695 |
| 2016/0246575 | A1* | 8/2016 | Baluch | G06F 8/427 |
| 2017/0083310 | A1* | 3/2017 | Barry | G06F 8/71 |
| 2017/0212751 | A1* | 7/2017 | Mak | G06F 11/3604 |
| 2017/0212754 | A1* | 7/2017 | Green | G06F 8/71 |
| 2019/0163478 | A1* | 5/2019 | Cimadamore | G06F 9/30058 |

OTHER PUBLICATIONS

Nguyen et al., "An Analysis of Merge Conflicts and Resolutions in Git-Based Open Source Projects" (Year: 2018).*

(Continued)

*Primary Examiner* — Phillip H Nguyen
(74) *Attorney, Agent, or Firm* — Mintz Levin Cohn Ferris Glovsky and Popeo, P.C.

(57) ABSTRACT

A method, a system, and a computer program product for detection of potential merge conflicts. One or more changes to one or more source code entries in a software application are received. One or more dependency relationships of the received changes to one or more source code entries are determined and analyzed. A data structure including at least one node corresponding to the received changes is generated. Using the dependency relationships and the generated data structure, one or more conflicting changes are identified.

17 Claims, 11 Drawing Sheets

(56) References Cited

OTHER PUBLICATIONS

Brosch, "Improving Conflict Resolution in Model Versioning Systems" (Year: 2009).*
Wloka et al., "Safe-Commit Analysis to Facilitate Team Software Development" (Year: 2009).*
Nelson et al., "The life-cycle of merge conflicts: processes, barriers, and strategies" (Year: 2019).*
Binkley et al., "Program Integration for Languages Procedure Calls" (Year: 1995).*
Qin et al., "Discovering Use Cases from Source Code using the Branch-Reserving Call Graph" (Year: 2003).*
Ren et al., "Identifying Failure Causes in Java Programs: An Application of Change Impact Analysis" (Year: 2006).*
Libxml2. http : //xml sof t . org/.
Lxml. https : //lxml. de/.
Accioly, Paulo et al., "Understanding semi-structured merge conflict characteristics in open-source java projects." Empirical Software Engineering, 23(4):2051, Aug. 2018.
Accioly, Paulo et al., "Analyzing conflict predictors in open-source java projects." In Proceedings of the 15th International Conference on Mining Software Repositories, MSR '18, pp. 576-586, New York, NY, USA, 2018. ACM.
Ahmed, Iftekhar et al., "An empirical examination of the relationship between code smells and merge conflicts." In Proceedings of the 11th ACM/IEEE International Symposium on Empirical Software Engineering and Measurement, ESEM '17, pp. 58-67, Piscataway, NJ, USA, 2017. IEEE Press.
Bohme, Marcel et al., "Regression tests to expose change interaction errors." In Proceedings of the 2013 9th Joint Meeting on Foundations of Software Engineering, ESEC/FSE 2013, pp. 334-344, New York, NY, USA, 2013. ACM.
Brun, Yuriy et al., "Speculative analysis: Exploring future development states of software." In Proceedings of the FSE/SDP Workshop on Future of Software Engineering Research, FoSER '10, pp. 59-64, New York, NY, USA, 2010. ACM.
Brun, Yuriy et al., "Crystal: Precise and unobtrusive conflict warnings." In Proceedings of the 19th ACM SIGSOFT Symposium, and the 13th European Conference on Foundations of Software Engineering, ESEC/FSE '11, pp. 444-447, New York, NY, USA, 2011. ACM.
Brun, Yuriy et al., "Proactive detection of collaboration conflicts." In Proceedings of the 19th ACM SIGSOFT Symposium and the 13th European Conference on Foundations of Software Engineering, ESEC/FSE '11, pp. 168-178, New York, NY, USA, 2011. ACM.
Srcml. https: //www. srcml . org/.
Dewan, Prasun et al., "Semi-synchronous conflict detection and resolution in asynchronous software development." ECSCW 2007, Jan. 2007.
Dias, Martin et al., "DeltaImpactFinder: Assessing semantic merge conflicts with dependency analysis." In Proceedings of the International Workshop on Smalltalk Technologies, IWST '15, pp. 8:1-8:6, New York, NY, USA, 2015. ACM.
Fallefi, Jean-Remy et al., "Fine-grained and accurate source code differencing." In ACM/IEEE International Conference on Automated Software Engineering, ASE '14, Vasteras, Sweden—Sep. 15-19, 2014, pp. 313-324, 2014.
Guimaraes, Mario Luis et al., "Improving early detection of software merge conflicts." In Proceedings of the 34th International Conference on Software Engineering, ICSE '12, pp. 342-352, Piscataway, NJ, USA, 2012. IEEE Press.
Hattori, Lile et al., "Syde: A tool for collaborative software development." In Proceedings of the 32nd ACM/IEEE International Conference on Software Engineering—vol. 2, ICSE '10, pp. 235-238, New York, NY, USA, 2010. ACM.
Hegde, Rajesh et al., "Connecting programming environments to support ad-hoc collaboration." In Proc. 23rd IEEE/ACM Int. Conf. Automated Software Engineering, pp. 178-187, Sep. 2008.
Kasi, Bakhtiar Khan et al., "Cassandra: Proactive conflict minimization through optimized task scheduling." In Proceedings of the 2013 International Conference on Software Engineering, ICSE '13, pp. 732-741, Piscataway, NJ, USA, 2013. IEEE Press.
Lessenich, Olaf et al., "Indicators for merge conflicts in the wild: Survey and empirical study." Automated Software Engg., 25(2):279-313, Jun. 2018.
Nelson, Nicholas et al., "The life-cycle of merge conflicts: processes, barriers, and strategies." Empirical Software Engineering, p. 1, Feb. 2019.
Nguyen, Hung Viet et al., "Detecting semantic merge conflicts with variability-aware execution." In Proceedings of the 2015 10th Joint Meeting on Foundations of Software Engineering, ESEC/FSE 2015, pp. 926-929, New York, NY, USA, 2015. ACM.
Pastore, Fabrizio et al., "Bdci: Behavioral driven conflict identification." In Proceedings of the 2017 11th Joint Meeting on Foundations of Software Engineering, ESEC/FSE 2017, pp. 570-581, New York, NY, USA, 2017. ACM.
Ryder, B. G., "Constructing the call graph of a program." IEEE Transactions on Software Engineering, SE-5(3):216-226, May 1979.
Sarma, Anita et al. "Palantir: Raising awareness among configuration management workspaces." In Proceedings of the 25th International Conference on Software Engineering, ICSE '03, pp. 444-454, Washington, DC, USA, 2003. IEEE Computer Society.
Sousa, Marcelo et al., "Verified three-way program merge." Proc. ACM Program. Lang., 2(OOPSLA):165:1-165:29, Oct. 2018.
World Wide Web Consortium (W3C). Xml path language (xpath). https://www.w3.org/TR/xpath/a11/. Accessed: Apr. 23, 2019.
Xing, X. et al., "Automatic software merging using automated program repair." In Proc. IEEE 1st Int. Workshop Intelligent Bug Fixing (IBF), pp. 11-16, Feb. 2019.

* cited by examiner

FIG. 3a

```
def get_visitors():
    distinct_visitors = []
    for visitor in visitors:
        if visitor not in distinct_visitors:
            distinct_visitors.append(visitor)

return distinct_visitors
```
302

FIG. 3b

```
def get_visitors():
    return visitors
```
304

```
def get_distinct_visitors():
    visitors = get_visitors()
    distinct_visitors = []
    for visitor in visitors:
        if visitor not in distinct_visitors:
            distinct_visitors.append(visitor)

return distinct_visitors
```
305

FIG. 3c

```
          ┌─ 306
def get_visitors():
    distinct_visitors = []
    for visitor in visitors:
        if visitor not in distinct_visitors:
            distinct_visitors.append(visitor)
    return distinct_visitors def get_lunch_amount():  ── 307
    visitors = get_visitors()
    lunch_count = 0
    for visitor in visitors:
        if ordered_lunch(visitor):
            lunch_count += 1
    return lunch_count
```

FIG. 3d

```
          ┌─ 308
def get_visitors():
    return visitors def get_distinct_visitors():  ── 309
    visitors = get_visitors()
    distinct_visitors = []
    for visitor in visitors:
        if visitor not in distinct_visitors:
            distinct_visitors.append(visitor)
    return distinct_visitors def get_lunch_amount():  ── 310
    visitors = get_visitors()
    lunch_count = 0
    for visitor in visitors:
        if ordered_lunch(visitor):
            lunch_count += 1
    return lunch_count
```

US 11,144,311 B2

STATIC ANALYSIS OF HIGHER-ORDER MERGE CONFLICTS IN LARGE SOFTWARE DEVELOPMENT PROJECTS

CROSS-REFERENCE TO RELATED APPLICATIONS

This application claims priority to U.S. Provisional Patent Appl. No. 62/849,544 to Wunsche, filed May 17, 2019, and entitled "Static Analysis Of Higher-Order Merge Conflicts In Large Software Development Projects," and incorporates its disclosure herein by reference in its entirety.

TECHNICAL FIELD

This disclosure relates generally to data processing and, in particular, to analysis and resolution of merge conflicts.

BACKGROUND

When multiple developers work on their individual copies of a software project, merge conflicts can occur once they share their contributions with each other. Changes made to the same lines of code are a well-known problem, as these overlaps have to be manually resolved by the developers. These textual conflicts are however not the only merge conflicts. Higher-order merge conflicts arise as the result of unintended interactions between changes, which may have been made to different parts of the source code. As higher-order merge conflicts are caused by a combination of changes, even thorough testing of the individual development branches cannot prevent them.

SUMMARY

In some implementations, the current subject matter relates to a computer-implemented method for detection of potential merge conflicts. The method may include receiving one or more changes to one or more source code entries in a software application, determining and analyzing one or more dependency relationships of the received one or more changes to one or more source code entries, generating a data structure including at least one node corresponding to the received one or more changes, and identifying, using the one or more dependency relationships and the generated data structure, one or more conflicting changes.

In some implementations, the current subject matter may include one or more of the following optional features. The method may also include resolving the conflicting changes. Further, the resolved changes may be merged with the one or more source code entries.

In some implementations, the changes may include at least one of the following: changes to the same location, one change depends on another change, unchanged code depends on multiple changes, multiple changes depend on unchanged code, changes are independent, and any combination thereof.

In some implementations, the at least one node in the data structure may include at least one of a filename and unique name within a file.

In some implementations, the generating of the data structure may include parsing at least one of the one or more changes, and extracting, based on parsing, and storing at least one of: one or more names of the source code entries, one or more calls to the source code entries, and any combination thereof, included in the changes. The generation of the data structure may also include determining at least one or more overlapping one or more names of the source code entries and one or more calls to the source code entries.

Non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

FIGS. 3a-d illustrate various branch development functions that may be resulting a conflict upon a merge;

DETAILED DESCRIPTION

Figure 1:
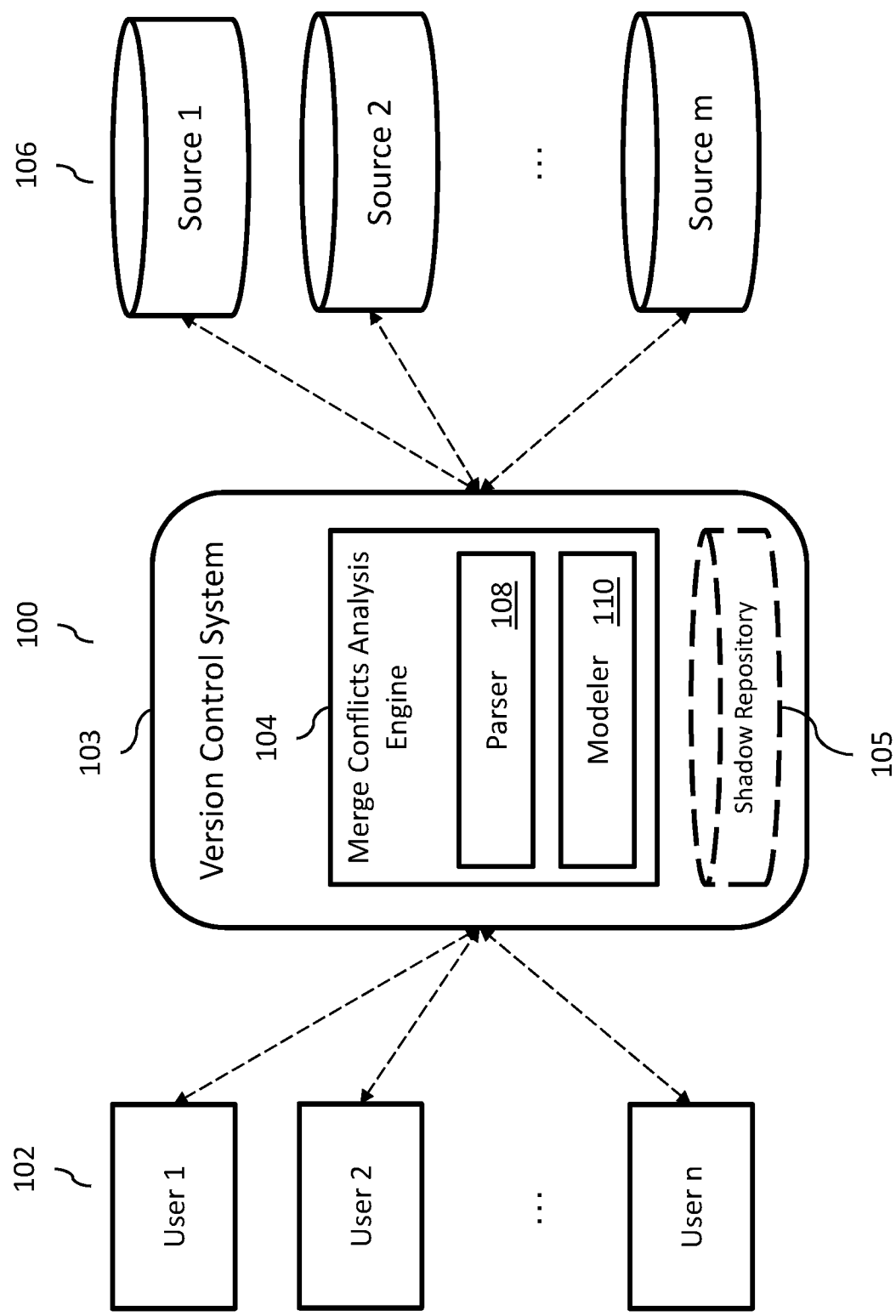
FIG. 1 illustrates an exemplary system for processing for identifying, analyzing, and/or resolving of merge conflicts, according to some implementations of the current subject matter.

To address these and potentially other deficiencies of currently available solutions, one or more implementations of the current subject matter relate to methods, systems, articles of manufacture, and the like that can, among other possible advantages, provide an ability to identify, analyze and resolve merge conflicts.

In some implementations, the current subject matter relates to an identification of potential higher-order merge conflicts using static analysis. Some exemplary implementations of the current subject matter may be implemented using High Performance Analytic Appliance ("HANA") system as developed by SAP SE, Walldorf, Germany, as will be described below. The current subject matter method may be configured to scale to large development projects and may be further configured to identify higher-order merge conflicts before they can reach the master branch.

Merge conflicts may occur, when the contributions of multiple developers to the same software project interact with each other in unintended ways. The most well-known type of merge conflict may be caused by changes to the same lines of code. In this case, the contributions cannot be automatically merged and manual intervention from the developers is required. Not all merge conflicts are so easy to find, some may pass the automated merge unnoticed and cause the program to fail its build or show unexpected behavior.

For example, a program may record visitors entering a building. Whenever a visitor enters and scans their ID card, an entry is stored in a database. The source code of the program is stored in a software repository, to allow multiple developers to easily share their work with each other. The program version currently in use is located on the master branch of the software repository. The master branch contains a function get_visitors( ) 302 (as shown in FIG. 3a) which returns a list containing the names of all distinct visitors, that entered the building that day.

Development of the program may continue in two separate branches. Branch visitors adds functionality to access distinct and non-distinct visitors. Function get_visitors( ) 302 now returns the names of all visitors in order of entry (as shown in FIG. 3a), with duplicates if a user entered the building multiple times. Function get_distinct_visitors( ) 305 (as shown in FIG. 3b along with new version of get_visitors( ) 304) is equivalent to the previous behavior of get_visitors( ) 302 and contains no duplicates. Branch lunch (as shown in FIG. 3c), implements a feature requested by the cafeteria staff. Frequent visitors, such as employees working in the building, may issue a daily lunch order. By comparing the list of visitors (e.g., a new version of get_visitors( ) 306) to the list of people who ordered lunch, the cafeteria staff hope to avoid preparing more food than required. Function get_lunch_amount( ) 307 implements this new feature (as shown in FIG. 3c).

Once each branch has finished testing their changes, they request a merge into the master (e.g., as may be designated by a system administrator) branch (as shown in FIG. 3d, which includes get_visitors( ) 308, get_distinct_visitors( ) 309, and get_lunch_amount( ) 310). While both branches individually fulfil their requirements, the merged master branch may include a new defect: multiple lunches will be prepared for visitors who entered the building several times. This is referred to as a semantic or higher-order merge conflict. After merging code changes, that were individually harmless, new defects arise in the master branch. As the defects were not present in the development branches, even thorough testing prior to the merge cannot protect the master branch from these conflicts. Higher-order merge conflicts can introduce build failures, which prevent the program from compiling. They can also cause tests to fail, or unintended behavior to make its way into the master branch, if no suitable tests are run.

In some implementations, the current subject matter may examine build failures, as they are easier to find and provide a suitable dataset for evaluation. Conventional approaches solve a problem for small and medium sized projects with extensive automated test suits, but they scale poorly for large projects, where compiling the code and executing a test run can take several hours. The current subject matter may identify potential merge conflicts by looking for code segments that depend on changes from different parallel development branches. Any dependencies may be determined statically and may require neither compilation nor test runs. By prioritizing speed over accuracy, the current subject matter system may be used even in projects with a large code base and dozens of parallel development branches.

In some exemplary implementations, the current subject matter may be configured to analyze dependency relationships of source code changes with regard to potential merge conflicts. In this case, the current subject matter system may differentiate between various exemplary scenarios, describing how changed code segments may depend on each other and how that dependency may lead to conflicts if the changes are merged. Some of the exemplary, non-limiting, scenarios may include at least one of the following: changes to the same location, one change depends on another, unchanged code depends on multiple changes, multiple changes depend on unchanged code, and/or changes are independent.

In some implementations, the current subject matter may be configured to perform approximate call graph creation or any other type of data structure generation. Here, a call graph may be statically created using "named units" as nodes. Each named unit may be represented by a combination of filename and unique name within the file. While this may be less accurate, but may be easier and/or faster to construct, and may be accelerated by reusing previously parsed source code. In some implementations, potential merge conflicts may be identified using dependency relationship(s) and call graph(s). In this case, cases of potentially conflicting changes as described in the dependency relationships in the call graph may be identified.

FIG. 1 illustrates an exemplary system 100 for processing for identifying, analyzing, and/or resolving of merge conflicts, according to some implementations of the current subject matter. The system 100 may include one or more users (user 1, user 2, . . . user n) 102, a version control system 103 that may include a merge conflicts analysis engine 104 and may setup a shadow repository 105 (e.g., for testing, analysis, conflict resolution, and/or any other purposes), and one or more data sources (source 1, source 2, . . . , source m) 106. The users 102, version control system 103, and the data sources 106 may be communicatively coupled via various computing components (e.g., computing tools, applications, various software, hardware, networks, etc.) with one another using any type of network, including but not limited to, wired, wireless, and/or a combination of both. For example, the users 102 may or may not directly communicate with the version control system 103 and/or any of its components and/or any sources 106. The users 102 may include at least one of the following: computer processors, computing networks, software applications, servers, user interfaces, and/or any combination of hardware and/or software components. The users 102 may be associated with development of software code for execution. Data sources 106 may include at least one of the following: databases, storage locations, memory locations, and/or any combination of hardware and/or software components. The data sources 106 may include various code for software applications that may be stored by the users 102 and/or may need to be analyzed for potential merge conflicts.

The version control system 103 along with the analysis engine 104 and/or shadow repository 105 may include any combination of software and/or hardware components and may be configured to receive and execute a process for identifying, analyzing, and/or resolving merge conflicts in data, files, code, software programs, etc. that may be received from one or more users 102. The analysis engine 104 and/or the shadow repository 105 may be part of the version control system 103 and/or communicatively coupled to it and/or exist outside of it. Alternatively, or in addition to, the sources 106 may include such data, files, code, software programs, etc. Such data, files, code, software programs, etc. may be associated with one or more computing projects.

In the following description, a master branch of a software repository may include the latest common version of project files and may be stored by one or more of the sources 106 and/or engine 104. For each part of the project, such as the development of a new computing, software, etc. feature, a development branch may be created, which may also be stored by one or more of the sources 106 and/or engine 104. Each development branch may include a separate version of the files, and changes made to one branch might not be automatically propagated to the master or the other branches. A local copy of the repository, which may have a working copy of the project files and a history of all past changes, may be cloned. By checking out one of the branches, the same version of the files may be shared without interfering with developers working on other development branches. A developer user 102 may make changes to their individual copy of the files and commit their changes to the development branch, where it is merged with the changes generated by other users 102.

Finally, the development branch may be merged with the master branch, where all changes may be combined. A merge conflict may occur when both parents of a merge have made changes, that interfere with one another. This may occur when the parents are the local repository of a developer and a development branch, or when a development branch and the master branch are combined.

A merge conflict that cannot be resolved automatically by the version control system (VCS) may be referred to as a textual conflict. These may also be called syntactic merge conflicts, as opposed to the higher-order conflicts or semantic merge conflicts that may follow the following. If the automatic merge succeeded, but the resulting code cannot be compiled, a build conflict may have occurred. In case neither of the previous two applies, but the merged program fails test cases, that were previously passed, a test conflict may exist. Other types of conflict may also exist, e.g., related to performance or code style do exist.

During development, branches may attempt to integrate with the master branch frequently (hourly, daily, weekly, etc.) to avoid growing too far apart, which would increase the cost of a merge, when it eventually happens. No code from the development branches may be accepted immediately. The changes may be first merged in a shadow repository (e.g., shadow repository 105 as may be setup by the version control system 103, as shown in FIG. 1), including a current state of the master branch. The resulting code may be build and subjected to a reduced set of regression tests. As largescale software projects come with a significant number of test cases, even this reduced run can take several hours when parallelized on powerful hardware. If one of the tests (or the preceding build) fails, the merge may be cancelled and must be reattempted once the issues have been resolved. This process ensures, that no textual or build conflicts are present in the master repository. Test conflicts may go unnoticed, if the corresponding test is not present in the reduced test set. In this case, the conflict may be found the next time the full regression test suite is run.

Due to the large-scale nature of such projects, the above procedure is often unrealistic. For example, assuming around 100 branches attempt to merge once per day, and each merge requires several hours to test, there is clearly not enough time to test all merges sequentially. Hence, this problem may be solved by reducing a number of test cases, by parallelizing the testing, and/or in any other way. While testing merges in parallel speeds up the testing process, it introduces a new scenario by which higher-order merge conflicts can be introduced into the master repository.

Figure 2:
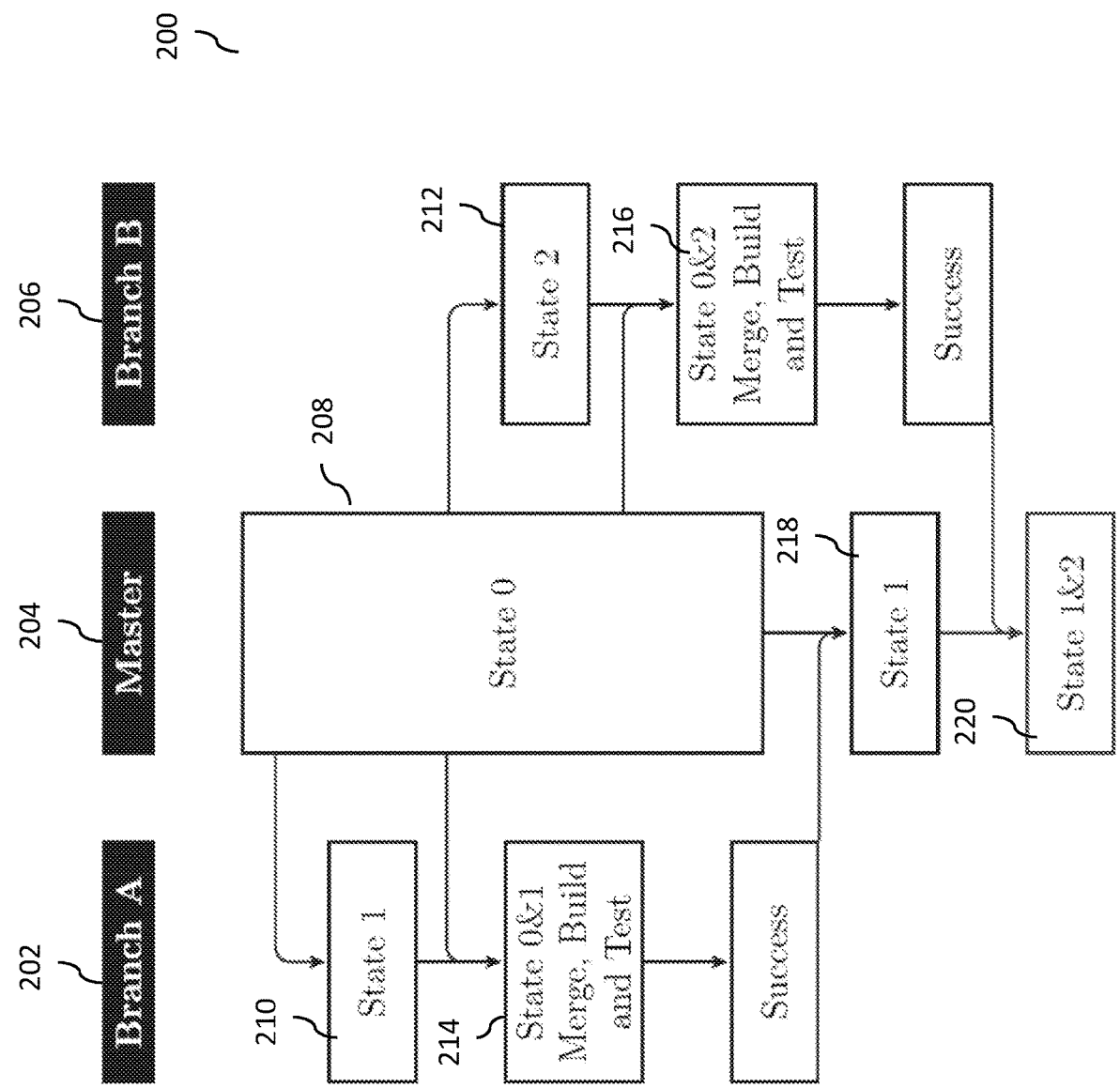
FIG. 2 illustrates an exemplary process for performing an untested merge on the master because of parallelizing pre-merge testing.

FIG. 2 illustrates an exemplary process 200 for performing an untested merge on the master because of parallelizing pre-merge testing. As shown in FIG. 2, the process may be performed by a master branch 204, a branch A 202, and a branch B 206. Branches A and B 204, 206 may clone state 0 208 from the master branch 204 and independently make changes, thereby creating the states 1 210 and 2 212, respectively. Branch A 202 may finish first and attempt to merge state 1 210 into the master branch. In a shadow repository (e.g., shadow repository 105 as shown in FIG. 1), state 1 and the current state of the master (still state 0 in this example) may be merged, compiled and tested, at 214. Meanwhile branch B 206 may start the same process for state 2 212. As state 1 is still undergoing testing, the current state of the master is 0. While the merge candidate of states 2 and 0 is tested, at 216, branch A 202 may pass all tests and may be merged into the master, at 218. As the merge of the states 0 and 1 has been tested, it may be assumed that there will be no conflicts. Once the tests for branch B 206 are passed successfully, state 2 may be merged into the master. In the meantime, the state of the master has changed, and instead of the tested merge between states 2 and 0 an untested merge occurs between states 1 and 2, at 220. A textual conflict would not be an issue, as a merge tool would recognize it and reject the change from branch B 206. This branch's current state may be removed from the master branch 204 and a local merge may be performed to resolve any issues/conflicts for later resubmission of the changes.

However, a higher-order conflict may lead to problems. In case of a build conflict, the code in the master branch 204 would no longer compile until a fix has been implemented. This makes testing any further changes impossible, as the shadow repository (e.g., shadow repository 105 as shown in FIG. 1) attempts to merge and build the broken code from the master with the submitted changes. Any other branches will also no longer be able to pull the current state of the master without breaking their code.

A test conflict would not halt production, but instead remain unnoticed until either the next full regression test of the master or until it causes tests to fail during the next attempted merge. The scenario involving the textual and built conflicts can be avoided by adding an additional merge and build step after testing. If this step is executed in sequence for all branches, these conflicts surface before they are added to the master. This is not an ideal solution, as it breaks the parallelization. Adding tests to this extra step would neutralize the benefit of the parallelization.

Figure 4B:
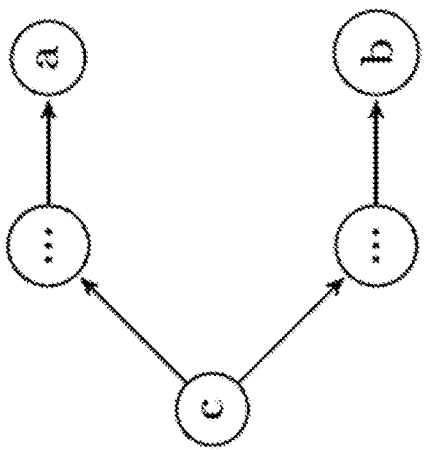
FIGS. 4a-c illustrate various dependency relationships that may need to be analyzed for the purposes of determining presence of merge conflicts.
Figure 4A:
Figure 4C:
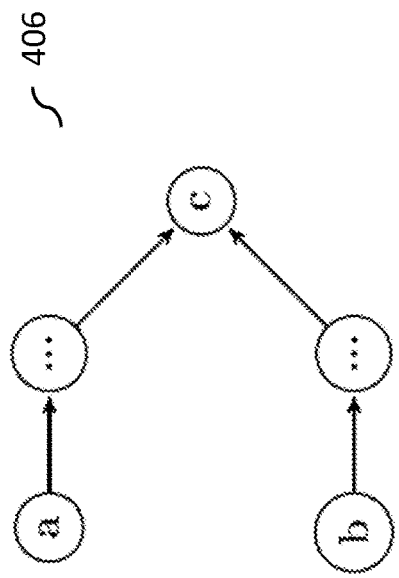

In some cases, dependency relationships among branches may result in various merge conflicts. FIGS. 4a-c illustrate various dependency relationships that may need to be analyzed for the purposes of determining presence of merge conflicts. For example, A and B are two different branches. A makes changes to entity a, while B modifies entity b (wherein entity may be data, code, file, software program, etc.). A c entity may be an entity at the same level as a and b, that has not been changed by either of the branches. Assuming that changes in both branches occur in the same location, various merge conflicts may exist. For example, textual conflicts may occur exclusively in this case. Higher-order conflicts may occur as well, e.g., in a method-level granularity, branch A changes the condition of an if-statement while branch B changes its body.

When the changes are separate, but one calls the other directly or indirectly, at 402, as shown in FIG. 4a, textual conflicts may be avoided. However, higher-order conflicts may still occur. File level dependencies may be estimated using an include graph, method level collisions may require a call-graph and/or one of its derivatives. These different granularities may be combined to achieve the desired balance between accuracy and speed (e.g., method level for direct and file level for indirect dependencies).

FIG. 4b shows, at 404, how two changes may be related without directly or indirectly calling each other. If an entity exists, which depends on both a and b, test conflicts may arise within this entity, even though no direct changes were made to it. As build conflicts are the result of invalid syntax, they may occur in entities that have been changed by at least one branch. If an unchanged file causes a build error, it may also have done so for one of the parents of the merge, which would have disqualified it during the pre-merge testing stage. To find this type of dependency, a reverse include or call graph is required. This is costly, because finding incoming calls requires a scan on the entire project, whereas outgoing calls can be found locally. Assuming a test covering this case exists, this type of dependency may not be required.

If changes are made to an entity a, which change the behavior of calling entity c, this should cause the tests of c to fail, which would halt the merge. To allow for the new behavior, the test cases of c would have to be adjusted, leading to a dependency between changes in the test case of c and the changes b of another branch. If both a and b change the behavior of c, as is the case in the example above, there could even be a direct collision within the test cases for c.

If the two changes both directly or indirectly call the same entity, at 406, as shown in FIG. 4c, without showing any of the patterns above, no textual, build or test conflicts may arise. Textual conflicts may only occur during direct collision, while both build and test conflicts require one of the changes to encounter unexpected behavior. Since c remains unchanged, it may behave exactly as both parents expect.

If none of the above cases apply, the changes may be independent. As there is no interaction between them, there is also no chance of unforeseen side-effects, such as merge conflicts.

In some implementations, the current subject matter system may be configured to find and predict higher-order merge conflicts. To model the dependencies between changes of two branches, a data structure or a call graph of the entire project may be generated. A call graph may be a static representation of relations between uniquely named procedures in a software program. It may model the structure of a program by representing source code elements as nodes. Directed edges between nodes may represent a call made from one entity to another. As such, call graphs may identify dependencies at named object level. Dependencies within the same named object, at the level of individual lines of code for instance, are not considered. Dynamic call graphs may be created by recording the sequence of events from a real execution. The resulting graph may be accurate, but may represent only one possible execution. Creating a dynamic call graph may require that the program be compiled and executed at least once. This is rather costly, especially when multiple executions are performed to cover different paths through the program. Static call graphs may attempt to represent all possible executions and show calls that may be executed (as opposed to dynamic graphs, which are certain about their calls).

Call graphs may be created during the build process. In some implementations, the current subject matter may be configured to construct an approximate call graph by parsing the source code using a parser (e.g., C++) and then extract one or more nodes. The nodes may include named units that may have an assigned name, which may be used to call them in different parts of the code (including from other files). All named units may call their own name. This may ensure that declarations and definitions are linked together, even if they are located in different files. Named units may include at least one of the following: a class (an exception may be made for classes defined in templates), a function (an exception may be made for overridden operators), a struct (a structure), a constructor, a destructor, an enum (enumeration), a typedef (type definition), an union, a macro (may be used for instance to implement unit-tests), one or more variables, and/or any other data. In some implementations, calling units may include a call to a named unit. They may include at least one of the following constructs: a call and a type.

Figure 5:
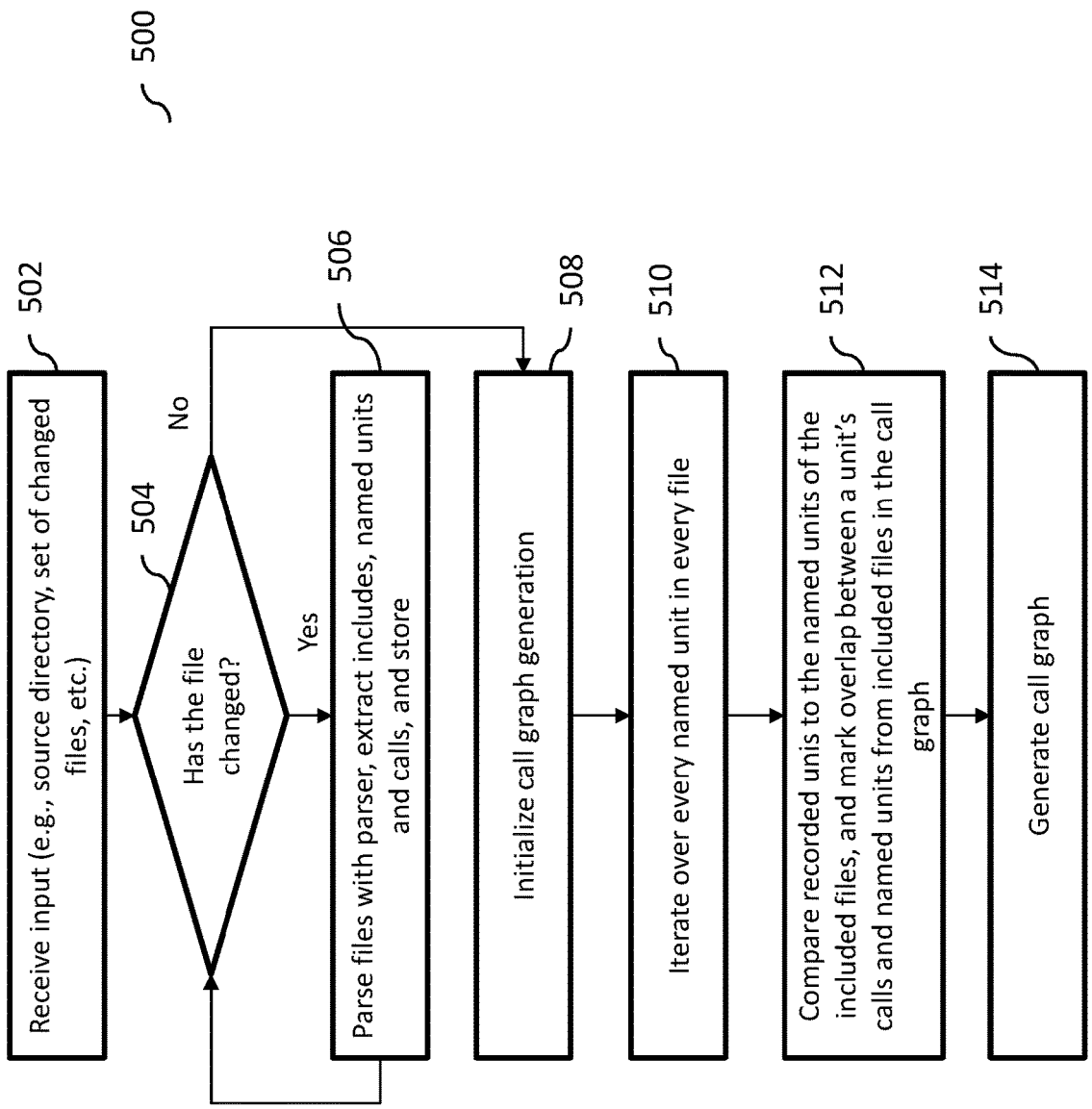
FIG. 5 illustrates an exemplary process for generation of a custom call graph, according to some implementations of the current subject matter.

FIG. 5 illustrates an exemplary process 500 for generation of a custom call graph, according to some implementations of the current subject matter. At 502, an input may be received by the system (e.g., system 100 as shown in FIG. 1). For example, the input may include a source directory, a set of changed files (e.g., when updating previous call graph, etc.). The source directory may be the master revision that may serve as the basis of the call graph and/or the branches. Each branch may be represented as a pair of hashes, representing the branch and the revision of the master branch at the time the merge was initiated or queued for testing. As the requested merge stays in the queue while other merges are tested, the revision of the master branch used to test the changes may be more recent. In some implementations, an octopus merge (e.g., a merge with more than two parents) may be performed, which merges all branches into the master revision all at once. If textual conflicts are detected, the merge fails and hence, there is no need to search for higher-order merge conflicts. The files that differ, at 504, between the octopus merge and the master branch revision from the last run (which is recorded in a separate file) determines, which source code files have to be parsed, to update the call graph.

At 506, if there are changed files at 504, a parser 108 (as shown in FIG. 1) may parses all changed files, e.g., one at a time. The results may then be scanned using a tree modeler component (e.g., XML document modeler) 110 (as shown in FIG. 1) for include statements, named units (e.g., file names, function names, etc.) and calls (e.g., function calls, program calls, etc.). An include statement may refer to inclusion of certain data. In some cases, if, for example, a code segment A which requires segment C, but does not explicitly state that dependency, then, A includes segment B, which in turn includes C. Thus, C is a transitive include of A with distance one.

In some implementations, calling units may be assigned to the named units that contain them. The extracted information may then be saved as a collection of files (e.g., JSON files), replicating the original file folder structure of the source directory. If no previous runs were recorded, and/or the preprocessed files may have been destroyed, the entire source directory may be parsed. In some implementations, unchanged files may be skipped.

Once there are no further changes, at 504, a creation of a call graph may be initiated, at 508. The call graph may be a sparse N×N matrix, where N is a number of named units across all files. This process may involve iteration over every named unit in every file, at 510 and comparing the recorded calling units to the named units of the included files, at 512. The level of transitive includes may be adjusted to determine more connections. The call graph may be recreated during each execution, as calls are not contained by file boundaries.

If a named unit matching a calling unit is found, the corresponding entry in the call graph may be marked, at 512. When the unit name is common, several potentially called units may be found and may be added to the call graph. At 514, the call graph may be generated and may include a mapping from a file identifier and named unit (e.g., as a JSON file).

Figure 6:
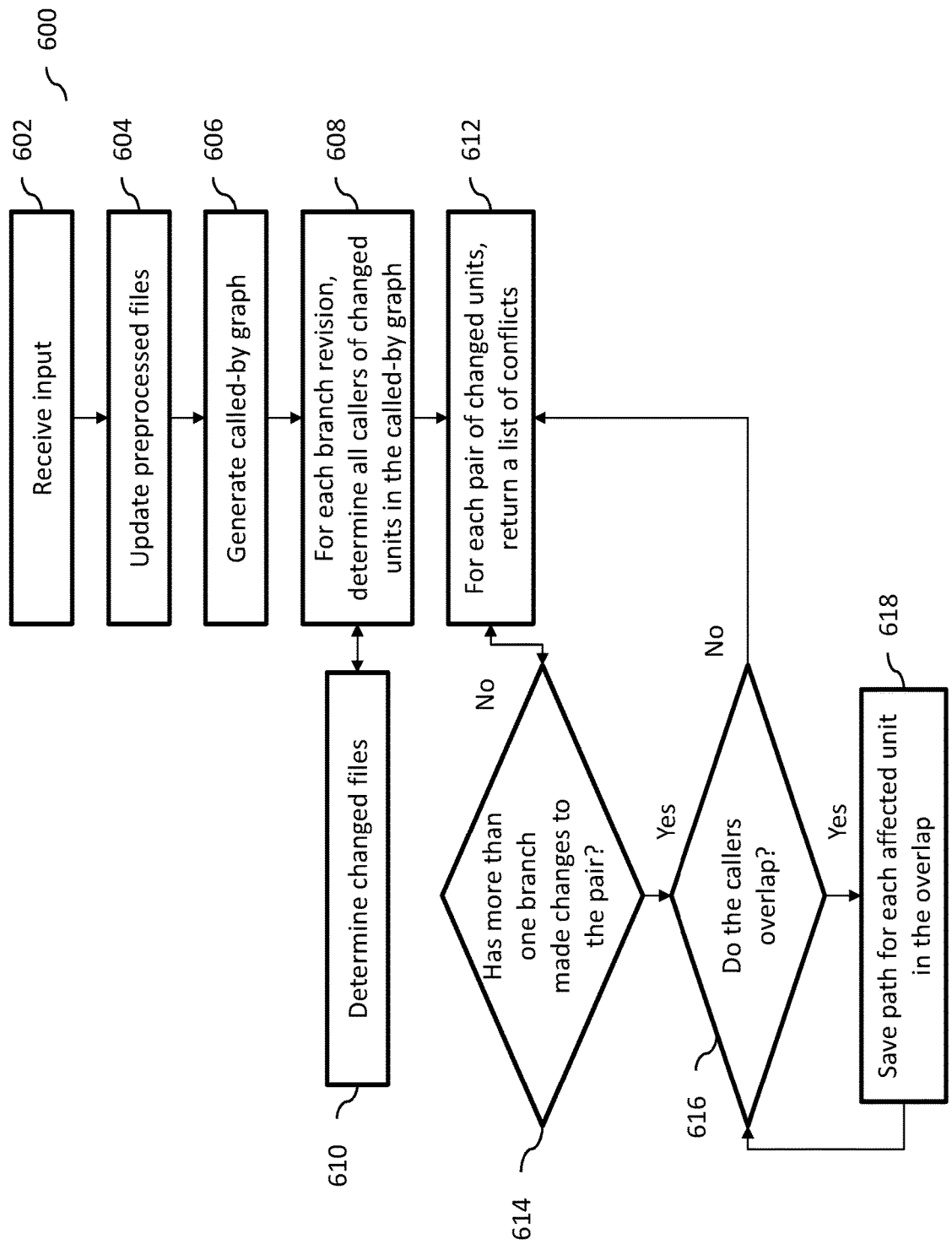
FIG. 6 illustrates an exemplary process for detecting conflicts, according to some implementations of the current subject matter.

FIG. 6 illustrates an exemplary process 600 for detecting conflicts, according to some implementations of the current subject matter. Once the call graph is generated (as shown in FIG. 5), potential conflicts may be detected using dependencies patterns discussed above. For example, the current subject matter may detect conflicting changes in the following cases: (1) both changes affect the same named unit, (2) a path of calls exists from one changed unit to the other, (3) two paths of calls, originating from the same (unchanged) named unit, exists and reach one of the changed units each, and/or any other cases. In the first case, the current subject matter may detect a potential conflict that may include two changed units and one affected unit, with a path of calls from the affected to each of the changes. In the second case, one of the paths may have a length one (containing only itself), which may mean that one of the changed units may also be the affected unit. The first case involves only a single named unit, filling the role of the affected and both changed units. Both paths contain only the unit itself. To more easily find named units, that can call two specific changed units, the call graph may be traversed in an opposite direction. To distinguish the reverse from the regular call graph, it may be referred to as a called-by graph, also known as a dependency graph.

Referring to FIG. 6, at 602, an input data may be received. The input may include source directory, up-to-date master revision, pairs of branch-revisions, master revision of the requested merge of data, etc. At 604, any pre-processed files may be updated. At 606, a called-by graph (or a dependency graph) may be constructed or generated.

At 608, for each branch revision, all callers of the changed units in the called-by graph may be determined. At 610, the process 600 may determine all changed files (e.g., differences between merged-base data and paired master revision may be determined). The information about determined changed files may be provided, so that all callers of all changed units may be determined, at 608.

Once all callers of changed units have been ascertained, for each pair of changed units (regardless of order), a list of conflict may be determined/returned, which may include information about affected unit, changed units, call paths, etc., at 612. However, prior to outputting a list of conflicts, a determination may be made whether more than one branch made changes to the pair of changed units, at 614. If so, a determination may be made whether any of the callers overlap, at 616. If so, a path for each affected unit in the overlap may be saved (to both changed units), at 618. Otherwise, the processing returns to 612, where a list of conflicts is returned. If, at 614, a single branch made changes to the pair of changed units, the processing also returns to 612.

Some of the advantages of the above processes include construction of call graphs without use of preprocessors, compilers, linkers, etc., which removes restrictions from the computing system that is running the merge conflict analysis, as the projects dependencies are not required. Compared to conventional approaches that perform builds and run tests, the current subject matter processes require less time on large scale projects. This is especially so when the analysis is performed regularly, as only a fraction of the source code files needs to be scanned again.

In some implementations, the current subject matter can be implemented in various in-memory database systems, such as a High Performance Analytic Appliance ("HANA") system as developed by SAP SE, Walldorf, Germany. Various systems, such as, enterprise resource planning ("ERP") system, supply chain management system ("SCM") system, supplier relationship management ("SRM") system, customer relationship management ("CRM") system, and/or others, can interact with the in-memory system for the purposes of accessing data, for example. Other systems and/or combinations of systems can be used for implementations of the current subject matter. The following is a discussion of an exemplary in-memory system.

Figure 7:
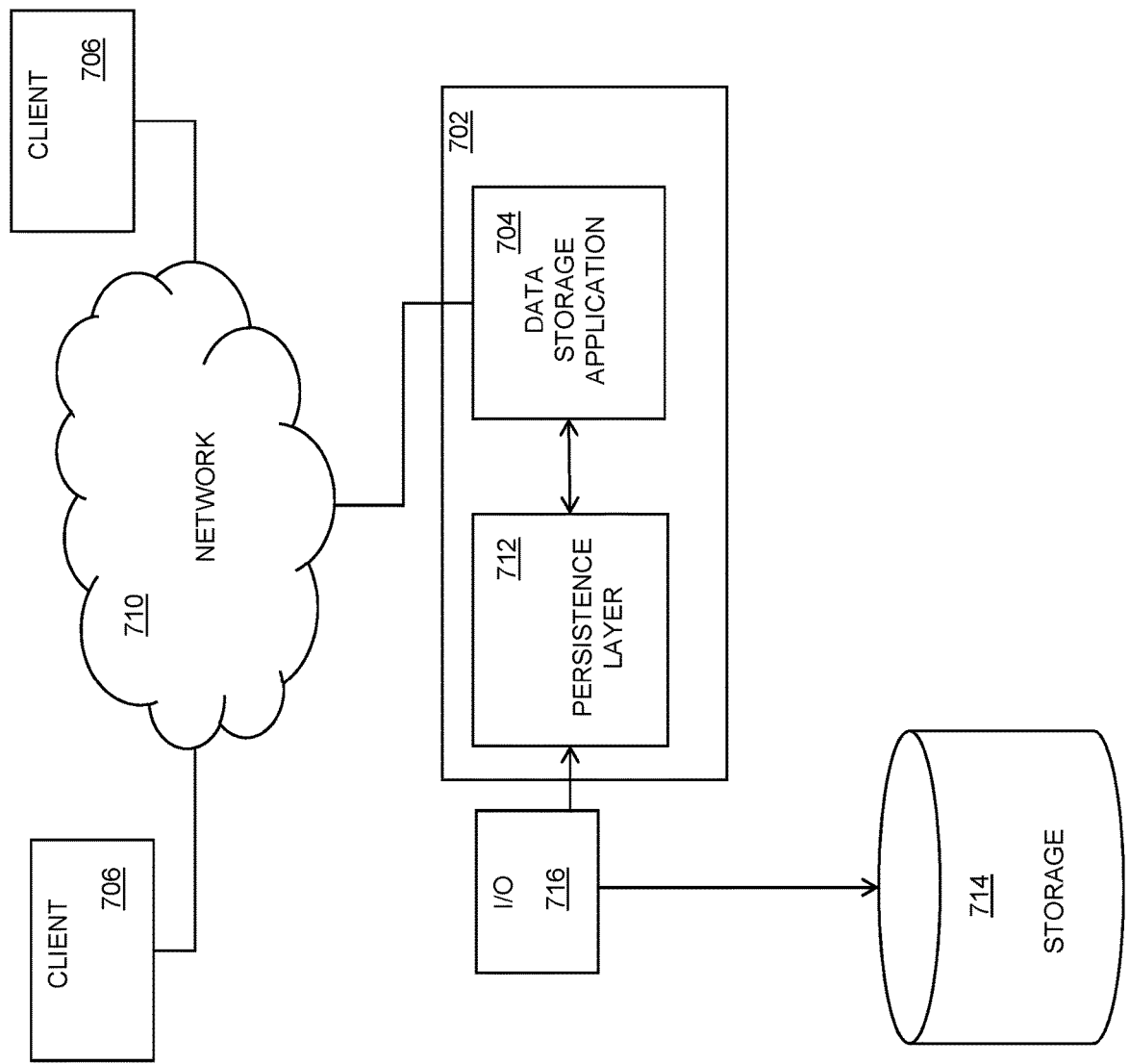
FIG. 7 is a diagram illustrating an exemplary system including a data storage application, according to some implementations of the current subject matter.

FIG. 7 illustrates an exemplary system 700 in which a computing system 702, which can include one or more programmable processors that can be collocated, linked over one or more networks, etc., executes one or more modules, software components, or the like of a data storage application 704, according to some implementations of the current subject matter. The data storage application 704 can include one or more of a database, an enterprise resource program, a distributed storage system (e.g. NetApp Filer available from NetApp of Sunnyvale, Calif.), or the like.

The one or more modules, software components, or the like can be accessible to local users of the computing system 702 as well as to remote users accessing the computing system 702 from one or more client machines 706 over a network connection 710. One or more user interface screens produced by the one or more first modules can be displayed to a user, either via a local display or via a display associated with one of the client machines 706. Data units of the data storage application 704 can be transiently stored in a persistence layer 712 (e.g., a page buffer or other type of temporary persistency layer), which can write the data, in the form of storage pages, to one or more storages 714, for example via an input/output component 716. The one or more storages 714 can include one or more physical storage media or devices (e.g. hard disk drives, persistent flash memory, random access memory, optical media, magnetic media, and the like) configured for writing data for longer term storage. It should be noted that the storage 714 and the input/output component 716 can be included in the computing system 702 despite their being shown as external to the computing system 702 in FIG. 7.

Data retained at the longer term storage 714 can be organized in pages, each of which has allocated to it a defined amount of storage space. In some implementations, the amount of storage space allocated to each page can be constant and fixed. However, other implementations in which the amount of storage space allocated to each page can vary are also within the scope of the current subject matter.

Figure 8:
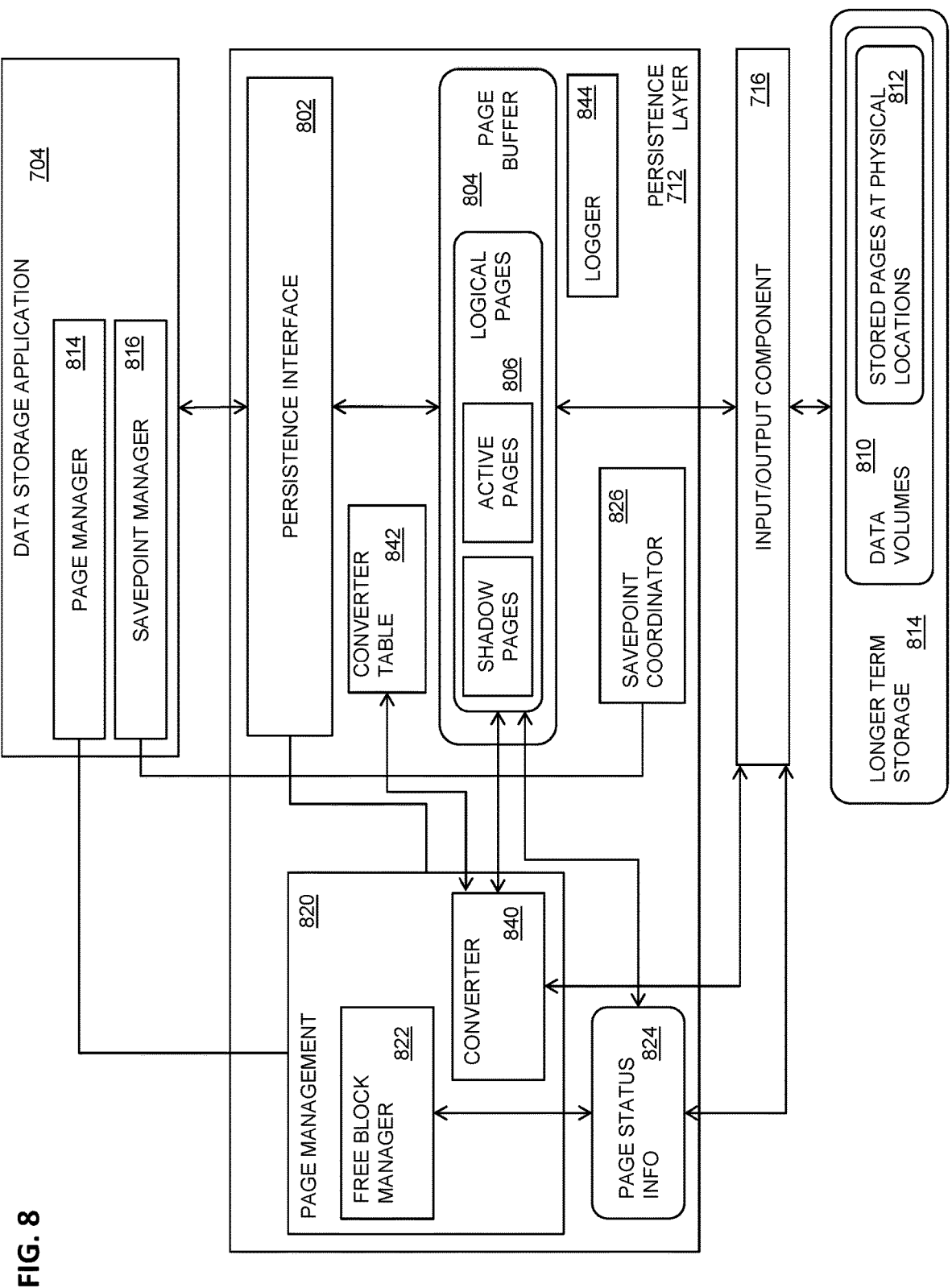
FIG. 8 is a diagram illustrating details of the system of FIG. 7.

FIG. 8 illustrates exemplary software architecture 800, according to some implementations of the current subject matter. A data storage application 704, which can be implemented in one or more of hardware and software, can include one or more of a database application, a network-attached storage system, or the like. According to at least some implementations of the current subject matter, such a data storage application 704 can include or otherwise interface with a persistence layer 712 or other type of memory buffer, for example via a persistence interface 802. A page buffer 804 within the persistence layer 712 can store one or more logical pages 806, and optionally can include shadow pages, active pages, and the like. The logical pages 806 retained in the persistence layer 712 can be written to a storage (e.g. a longer term storage, etc.) 714 via an input/output component 716, which can be a software module, a sub-system implemented in one or more of software and hardware, or the like. The storage 714 can include one or more data volumes 810 where stored pages 812 are allocated at physical memory blocks.

In some implementations, the data storage application 704 can include or be otherwise in communication with a page manager 814 and/or a savepoint manager 816. The page manager 814 can communicate with a page management module 820 at the persistence layer 712 that can include a free block manager 822 that monitors page status information 824, for example the status of physical pages within the storage 714 and logical pages in the persistence layer 712 (and optionally in the page buffer 804). The savepoint manager 816 can communicate with a savepoint coordinator 826 at the persistence layer 712 to handle savepoints, which are used to create a consistent persistent state of the database for restart after a possible crash.

In some implementations of a data storage application 704, the page management module of the persistence layer 712 can implement a shadow paging. The free block manager 822 within the page management module 820 can maintain the status of physical pages. The page buffer 804 can include a fixed page status buffer that operates as discussed herein. A converter component 840, which can be part of or in communication with the page management module 820, can be responsible for mapping between logical and physical pages written to the storage 714. The converter 840 can maintain the current mapping of logical pages to the corresponding physical pages in a converter table 842. The converter 840 can maintain a current mapping of logical pages 806 to the corresponding physical pages in one or more converter tables 842. When a logical page 806 is read from storage 714, the storage page to be loaded can be looked up from the one or more converter tables 842 using the converter 840. When a logical page is written to storage 714 the first time after a savepoint, a new free physical page is assigned to the logical page. The free block manager 822 marks the new physical page as "used" and the new mapping is stored in the one or more converter tables 842.

The persistence layer 712 can ensure that changes made in the data storage application 704 are durable and that the data storage application 704 can be restored to a most recent committed state after a restart. Writing data to the storage 714 need not be synchronized with the end of the writing transaction. As such, uncommitted changes can be written to disk and committed changes may not yet be written to disk when a writing transaction is finished. After a system crash, changes made by transactions that were not finished can be rolled back. Changes occurring by already committed transactions should not be lost in this process. A logger component 844 can also be included to store the changes made to the data of the data storage application in a linear log. The logger component 844 can be used during recovery to replay operations since a last savepoint to ensure that all operations are applied to the data and that transactions with a logged "commit" record are committed before rolling back still-open transactions at the end of a recovery process.

With some data storage applications, writing data to a disk is not necessarily synchronized with the end of the writing transaction. Situations can occur in which uncommitted changes are written to disk and while, at the same time, committed changes are not yet written to disk when the writing transaction is finished. After a system crash, changes made by transactions that were not finished must be rolled back and changes by committed transaction must not be lost.

To ensure that committed changes are not lost, redo log information can be written by the logger component 844 whenever a change is made. This information can be written to disk at latest when the transaction ends. The log entries can be persisted in separate log volumes while normal data is written to data volumes. With a redo log, committed changes can be restored even if the corresponding data pages were not written to disk. For undoing uncommitted changes, the persistence layer 712 can use a combination of undo log entries (from one or more logs) and shadow paging.

The persistence interface 802 can handle read and write requests of stores (e.g., in-memory stores, etc.). The persistence interface 802 can also provide write methods for writing data both with logging and without logging. If the logged write operations are used, the persistence interface 802 invokes the logger 844. In addition, the logger 844 provides an interface that allows stores (e.g., in-memory stores, etc.) to directly add log entries into a log queue. The logger interface also provides methods to request that log entries in the in-memory log queue are flushed to disk.

Log entries contain a log sequence number, the type of the log entry and the identifier of the transaction. Depending on the operation type additional information is logged by the logger 844. For an entry of type "update", for example, this would be the identification of the affected record and the after image of the modified data.

When the data application 704 is restarted, the log entries need to be processed. To speed up this process the redo log is not always processed from the beginning. Instead, as stated above, savepoints can be periodically performed that write all changes to disk that were made (e.g., in memory, etc.) since the last savepoint. When starting up the system, only the logs created after the last savepoint need to be processed. After the next backup operation the old log entries before the savepoint position can be removed.

When the logger 844 is invoked for writing log entries, it does not immediately write to disk. Instead it can put the log entries into a log queue in memory. The entries in the log queue can be written to disk at the latest when the corresponding transaction is finished (committed or aborted). To guarantee that the committed changes are not lost, the commit operation is not successfully finished before the corresponding log entries are flushed to disk. Writing log queue entries to disk can also be triggered by other events, for example when log queue pages are full or when a savepoint is performed.

With the current subject matter, the logger 844 can write a database log (or simply referred to herein as a "log") sequentially into a memory buffer in natural order (e.g., sequential order, etc.). If several physical hard disks/storage devices are used to store log data, several log partitions can be defined. Thereafter, the logger 844 (which as stated above acts to generate and organize log data) can load-balance writing to log buffers over all available log partitions. In some cases, the load-balancing is according to a round-robin distributions scheme in which various writing operations are directed to log buffers in a sequential and continuous manner. With this arrangement, log buffers written to a single log segment of a particular partition of a multi-partition log are not consecutive. However, the log buffers can be reordered from log segments of all partitions during recovery to the proper order.

As stated above, the data storage application 704 can use shadow paging so that the savepoint manager 816 can write a transactionally-consistent savepoint. With such an arrangement, a data backup comprises a copy of all data pages contained in a particular savepoint, which was done as the first step of the data backup process. The current subject matter can be also applied to other types of data page storage.

Figure 9:
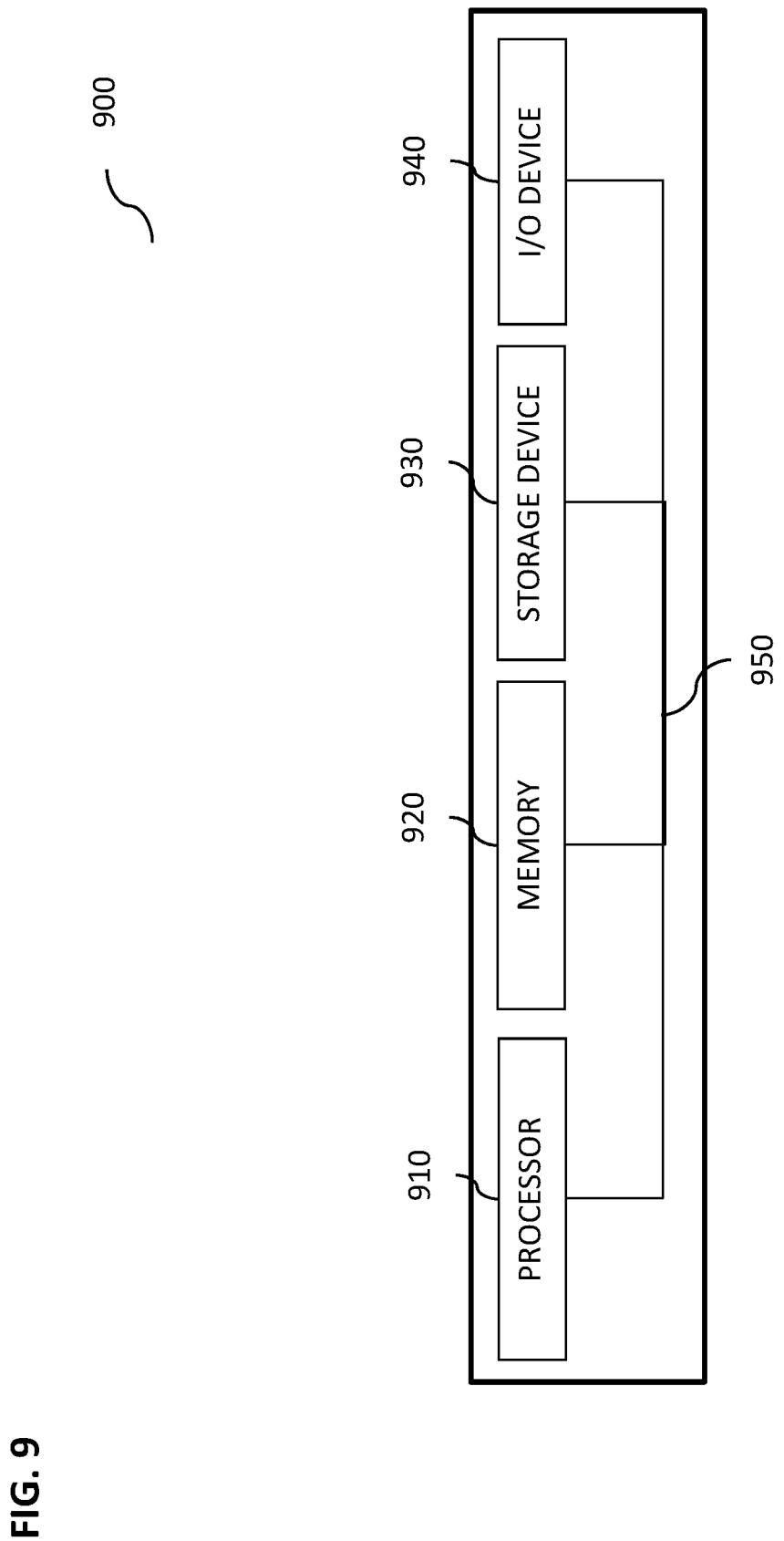
FIG. 9 is an exemplary system, according to some implementations of the current subject matter.

In some implementations, the current subject matter can be configured to be implemented in a system 900, as shown in FIG. 9. The system 900 can include a processor 910, a memory 920, a storage device 930, and an input/output device 940. Each of the components 910, 920, 930 and 940 can be interconnected using a system bus 950. The processor 910 can be configured to process instructions for execution within the system 900. In some implementations, the processor 910 can be a single-threaded processor. In alternate implementations, the processor 910 can be a multi-threaded processor. The processor 910 can be further configured to process instructions stored in the memory 920 or on the storage device 930, including receiving or sending information through the input/output device 940. The memory 920 can store information within the system 900. In some implementations, the memory 920 can be a computer-readable medium. In alternate implementations, the memory 920 can be a volatile memory unit. In yet some implementations, the memory 920 can be a non-volatile memory unit. The storage device 930 can be capable of providing mass storage for the system 900. In some implementations, the storage device 930 can be a computer-readable medium. In alternate implementations, the storage device 930 can be a floppy disk device, a hard disk device, an optical disk device, a tape device, non-volatile solid state memory, or any other type of storage device. The input/output device 940 can be configured to provide input/output operations for the system 900. In some implementations, the input/output device 940 can include a keyboard and/or pointing device. In alternate implementations, the input/output device 940 can include a display unit for displaying graphical user interfaces.

Figure 10:
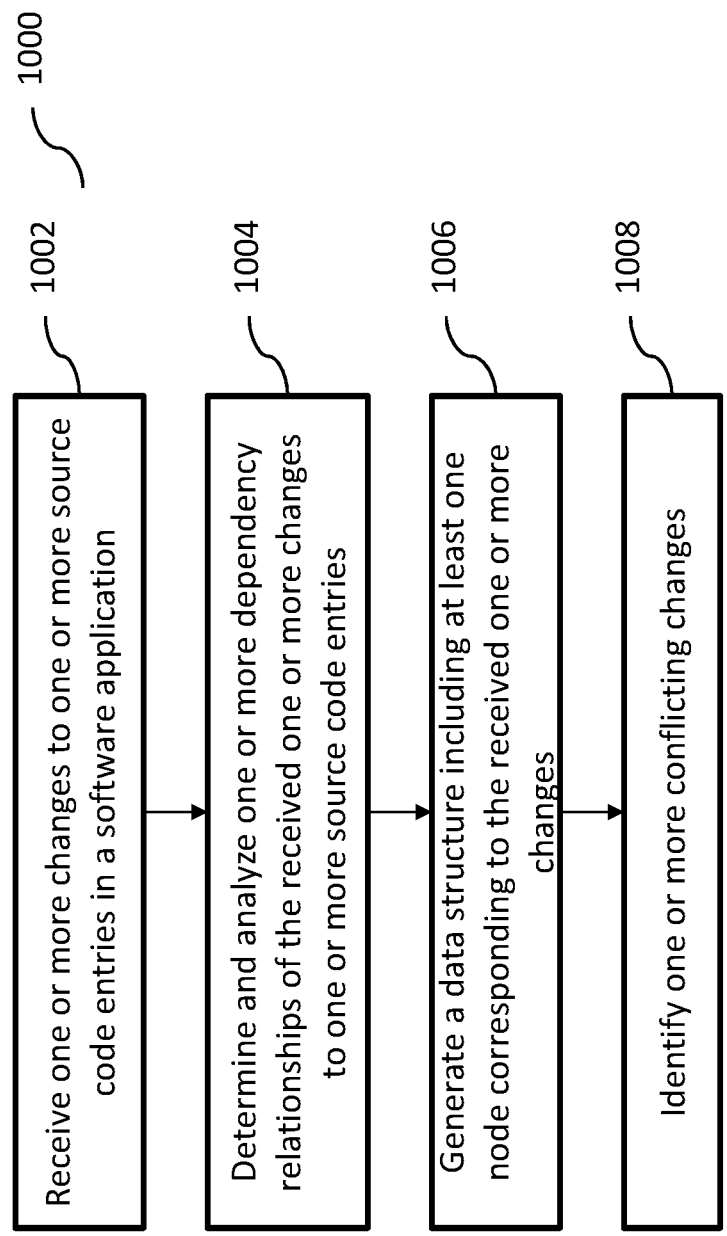
FIG. 10 is an exemplary process, according to some implementations of the current subject matter.

FIG. 10 illustrates an exemplary process for detection of potential merge conflicts, according to some implementations of the current subject matter. At 1002, one or more changes to one or more source code entries in a software application may be received (e.g., by the engine 104 shown in FIG. 1). At 1004, one or more dependency relationships of the received one or more changes to one or more source code entries may be determined and/or analyzed, where the source code entries may be existing source code entries and/or other source code entries that, for example, may be generated by developer that is different from the developer associated with the received changes.

At 1006, a data structure including at least one node corresponding to the received one or more changes may be generated. The nodes may correspond to named units (in some implementations, these may include files, lines of code, and/or any other units), regardless of whether or not they were changed. For example, changes may occur in a small portion of source code, whereby not all nodes may be part of a received change. The data structure may include a call graph, as shown in FIG. 5. The data structure may also be used to analyze dependencies between one or more source code entities. In some implementations, the data structure may also include a reversed call graph (as discussed above in connection with FIG. 6) that may be used to determine these dependencies. For example, at different granularities, different types of dependency graphs may be used, e.g., at file level, generation/use of the call graph may be omitted, and instead, an include graph may be used.

At 1008, using the one or more dependency relationships and the generated data structure, one or more conflicting changes may be identified. Identification of the conflicting changes may be performed using a dependency graph, as discussed above with regard to FIG. 6.

In some implementations, the current subject matter may include one or more of the following optional features. The method may also include resolving the conflicting changes. Further, the resolved changes may be merged with the one or more source code entries.

In some implementations, the changes may include at least one of the following: changes to the same location, one change depends on another change, unchanged code depends on multiple changes, multiple changes depend on unchanged code, changes are independent, and any combination thereof.

In some implementations, the at least one node in the data structure may include at least one of a filename and unique name within a file.

In some implementations, the generating of the data structure may include parsing at least one of the one or more changes, and extracting, based on parsing, and storing at least one of: one or more names of the source code entries, one or more calls to the source code entries, and any combination thereof, included in the changes. The generation of the data structure may also include determining at least one or more overlapping one or more names of the source code entries and one or more calls to the source code entries.

The systems and methods disclosed herein can be embodied in various forms including, for example, a data processor, such as a computer that also includes a database, digital electronic circuitry, firmware, software, or in combinations of them. Moreover, the above-noted features and other aspects and principles of the present disclosed implementations can be implemented in various environments. Such environments and related applications can be specially constructed for performing the various processes and operations according to the disclosed implementations or they can include a general-purpose computer or computing platform selectively activated or reconfigured by code to provide the necessary functionality. The processes disclosed herein are not inherently related to any particular computer, network, architecture, environment, or other apparatus, and can be implemented by a suitable combination of hardware, software, and/or firmware. For example, various general-purpose machines can be used with programs written in accordance with teachings of the disclosed implementations, or it can be more convenient to construct a specialized apparatus or system to perform the required methods and techniques.

The systems and methods disclosed herein can be implemented as a computer program product, i.e., a computer program tangibly embodied in an information carrier, e.g., in a machine readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

As used herein, the term "user" can refer to any entity including a person or a computer.

Although ordinal numbers such as first, second, and the like can, in some situations, relate to an order; as used in this document ordinal numbers do not necessarily imply an order. For example, ordinal numbers can be merely used to distinguish one item from another. For example, to distinguish a first event from a second event, but need not imply any chronological ordering or a fixed reference system (such that a first event in one paragraph of the description can be different from a first event in another paragraph of the description).

The foregoing description is intended to illustrate but not to limit the scope of the invention, which is defined by the scope of the appended claims. Other implementations are within the scope of the following claims.

These computer programs, which can also be referred to programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user can provide input to the computer. Other kinds of devices can be used to provide for interaction with a user as well. For example, feedback provided to the user can be any form of sensory feedback, such as for example visual feedback, auditory feedback, or tactile feedback; and input from the user can be received in any form, including, but not limited to, acoustic, speech, or tactile input.

The subject matter described herein can be implemented in a computing system that includes a back-end component, such as for example one or more data servers, or that includes a middleware component, such as for example one or more application servers, or that includes a front-end component, such as for example one or more client computers having a graphical user interface or a Web browser through which a user can interact with an implementation of the subject matter described herein, or any combination of such back-end, middleware, or front-end components. The components of the system can be interconnected by any form or medium of digital data communication, such as for example a communication network. Examples of communication networks include, but are not limited to, a local area network ("LAN"), a wide area network ("WAN"), and the Internet.

The computing system can include clients and servers. A client and server are generally, but not exclusively, remote from each other and typically interact through a communication network. The relationship of client and server arises by virtue of computer programs running on the respective computers and having a client-server relationship to each other.

The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. In addition, the logic flows depicted in the accompanying figures and/or described herein do not necessarily require the particular order shown, or sequential order, to achieve desirable results. Other implementations can be within the scope of the following claims.

What is claimed:

1. A computer-implemented method, comprising:
receiving one or more changes to one or more source code entries in a software application;
determining and analyzing one or more dependency relationships of the received one or more changes to one or more source code entries;
generating a data structure including at least one node corresponding to the received one or more changes, the data structure including an approximate call graph generated using at least one or more of determined overlapping of one or more names of the one or more source code entries and one or more calls to the one or more source code entries in the one or more changes; and
identifying, using the one or more dependency relationships and the generated approximate call graph, one or more conflicting changes.

2. The method according to claim 1, further comprising resolving the one or more conflicting changes.

3. The method according to claim 2, further comprising merging the resolved one or more changes with the one or more source code entries.

4. The method according to claim 1, wherein the one or more changes include at least one of the following: changes to the same location, one change depends on another change, unchanged code depends on multiple changes, multiple changes depend on unchanged code, changes are independent, and any combination thereof.

5. The method according to claim 1, wherein the at least one node in the data structure include at least one of a filename and unique name within a file.

6. The method according to claim 1, wherein the generating includes parsing at least one of the one or more changes; and
   extracting, based on parsing, and storing at least one of: one or more names of the one or more source code entries, one or more calls to the one or more source code entries, and any combination thereof, included in the one or more changes.

7. A system comprising:
   at least one programmable processor; and
   a non-transitory machine-readable medium storing instructions that, when executed by the at least one programmable processor, cause the at least one programmable processor to perform operations comprising:
      receiving one or more changes to one or more source code entries in a software application;
      determining and analyzing one or more dependency relationships of the received one or more changes to one or more source code entries;
      generating a data structure including at least one node corresponding to the received one or more changes, the data structure including an approximate call graph generated using at least one or more of determined overlapping of one or more names of the one or more source code entries and one or more calls to the one or more source code entries in the one or more changes; and
      identifying, using the one or more dependency relationships and the generated approximate call graph, one or more conflicting changes.

8. The system according to claim 7, wherein the operations further comprise resolving the one or more conflicting changes.

9. The system according to claim 8, wherein the operations further comprise merging the resolved one or more changes with the one or more source code entries.

10. The system according to claim 7, wherein the one or more changes include at least one of the following: changes to the same location, one change depends on another change, unchanged code depends on multiple changes, multiple changes depend on unchanged code, changes are independent, and any combination thereof.

11. The system according to claim 7, wherein the at least one node in the data structure include at least one of a filename and unique name within a file.

12. The system according to claim 7, wherein the generating includes parsing at least one of the one or more changes; and
   extracting, based on parsing, and storing at least one of: one or more names of the one or more source code entries, one or more calls to the one or more source code entries, and any combination thereof, included in the one or more changes.

13. A computer program product comprising a non-transitory machine-readable medium storing instructions that, when executed by at least one programmable processor, cause the at least one programmable processor to perform operations comprising:
   receiving one or more changes to one or more source code entries in a software application;
   determining and analyzing one or more dependency relationships of the received one or more changes to one or more source code entries;
   generating a data structure including at least one node corresponding to the received one or more changes, the data structure including an approximate call graph generated using at least one or more of determined overlapping of one or more names of the one or more source code entries and one or more calls to the one or more source code entries in the one or more changes; and
   identifying, using the one or more dependency relationships and the generated approximate call graph, one or more conflicting changes.

14. The computer program product according to claim 13, wherein the operations further comprise
   resolving the one or more conflicting changes; and
   merging the resolved one or more changes with the one or more source code entries.

15. The computer program product according to claim 13, wherein the one or more changes include at least one of the following: changes to the same location, one change depends on another change, unchanged code depends on multiple changes, multiple changes depend on unchanged code, changes are independent, and any combination thereof.

16. The computer program product according to claim 13, wherein the at least one node in the data structure include at least one of a filename and unique name within a file.

17. The computer program product according to claim 13, wherein the generating includes
   parsing at least one of the one or more changes; and
   extracting, based on parsing, and storing at least one of: one or more names of the one or more source code entries, one or more calls to the one or more source code entries, and any combination thereof, included in the one or more changes.

* * * * *